US009013983B2

(12) United States Patent
Vasseur et al.

(10) Patent No.: US 9,013,983 B2
(45) Date of Patent: Apr. 21, 2015

(54) PROACTIVE SOURCE-BASED REVERSE PATH VALIDATION IN COMPUTER NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 13/230,154

(22) Filed: Sep. 12, 2011

(65) Prior Publication Data

US 2013/0064072 A1   Mar. 14, 2013

(51) Int. Cl.
*G01R 31/08* (2006.01)
*H04L 29/08* (2006.01)
*H04L 12/26* (2006.01)
*H04L 12/751* (2013.01)
*H04L 12/721* (2013.01)
*H04L 12/707* (2013.01)
*H04L 12/703* (2013.01)
*H04L 12/24* (2006.01)

(52) U.S. Cl.
CPC ............ *H04L 67/145* (2013.01); *H04L 43/10* (2013.01); *H04L 41/12* (2013.01); *H04L 45/026* (2013.01); *H04L 45/34* (2013.01); *H04L 45/36* (2013.01); *H04L 45/22* (2013.01); *H04L 45/28* (2013.01)

(58) Field of Classification Search
USPC ........................................................ 370/255
See application file for complete search history.

(56) References Cited

U.S. PATENT DOCUMENTS

| 6,538,988 | B1 | 3/2003 | Natarajan et al. |
| 6,658,595 | B1 | 12/2003 | Thamattoor |
| 6,880,090 | B1 * | 4/2005 | Shawcross ...................... 726/14 |
| 7,065,268 | B2 | 6/2006 | Prairie et al. |
| 7,342,897 | B1 | 3/2008 | Nader et al. |
| 7,583,593 | B2 | 9/2009 | Guichard et al. |
| 7,626,948 | B1 | 12/2009 | Cook et al. |
| 7,768,996 | B1 | 8/2010 | Fourie et al. |
| 7,860,025 | B2 | 12/2010 | Thubert et al. |
| 7,912,934 | B1 | 3/2011 | Melton et al. |

(Continued)

OTHER PUBLICATIONS

"RPL: IPv6 Routing Protocol for Low Power and Lossy Networks", <draft-ietf-roll-rpl-19> by Winter, et al., (Mar. 13, 2011 version).

(Continued)

*Primary Examiner* — Brian Roberts
*Assistant Examiner* — Abu-Sayeed Haque
(74) *Attorney, Agent, or Firm* — Parker Ibrahim & Berg LLC; James M. Behmke; Kenneth J. Heywood

(57) ABSTRACT

In one embodiment, a network device may receive an indication of a particular future message time, and determines a path validation time that is prior to the particular future message time by an amount at least long enough to detect and report a route change of a path from the network device to a source of the particular future message, wherein the source utilizes the path in reverse to reach the network device for the particular future message. Accordingly, the network device sends, at the path validation time, a keepalive message on the path, where in response to a failure of the keepalive message on the path, the network device repairs the path to the source with a particular route change, and reports the particular route change to the source, e.g., such that in response, the source may transmit the particular future message on the changed path in reverse.

25 Claims, 15 Drawing Sheets

(56) References Cited

U.S. PATENT DOCUMENTS

| | | |
|---|---|---|
| 7,990,888 B2 | 8/2011 | Nadeau et al. |
| 2005/0083835 A1 | 4/2005 | Prairie et al. |
| 2009/0154481 A1* | 6/2009 | Han et al. .................. 370/406 |
| 2010/0214960 A1* | 8/2010 | Bahr et al. .................. 370/255 |

OTHER PUBLICATIONS

"Routing Metrics used for Path Calculation in Low Power and Lossy Networks", <draft-ietf-roll-routing-metrics-19> by Vasseur, et al., (Mar. 1, 2011 version).

"RPL Objective Function 0", <draft-ietf-roll-of0-15> by Thubert (Jul. 8, 2011 version).

"The Minimum Rank Objective Function with Hysteresis", <draft-ietf-roll-minrank-hysteresis-of-04> by O. Gnawali et al., (May 17, 2011 version).

"Constrained Application Protocol (CoAP)", <draft-ietf-core-coap-07>, by Shelby et al., (Jul. 8, 2011 edition).

* cited by examiner

US 9,013,983 B2

PROACTIVE SOURCE-BASED REVERSE PATH VALIDATION IN COMPUTER NETWORKS

TECHNICAL FIELD

The present disclosure relates generally to computer networks, and, more particularly, to path validation in computer networks, e.g., via keepalive messages.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

One fundamental problem is that nodes in many LLNs only maintain links in the UPWARD direction (toward a root node), and detect link failures reactively when sending a data packet. If a node has no data packets to send, it will not detect the link failure and will not notify the root that the link is no longer valid. As a result, the root will continue to send traffic down an invalid path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
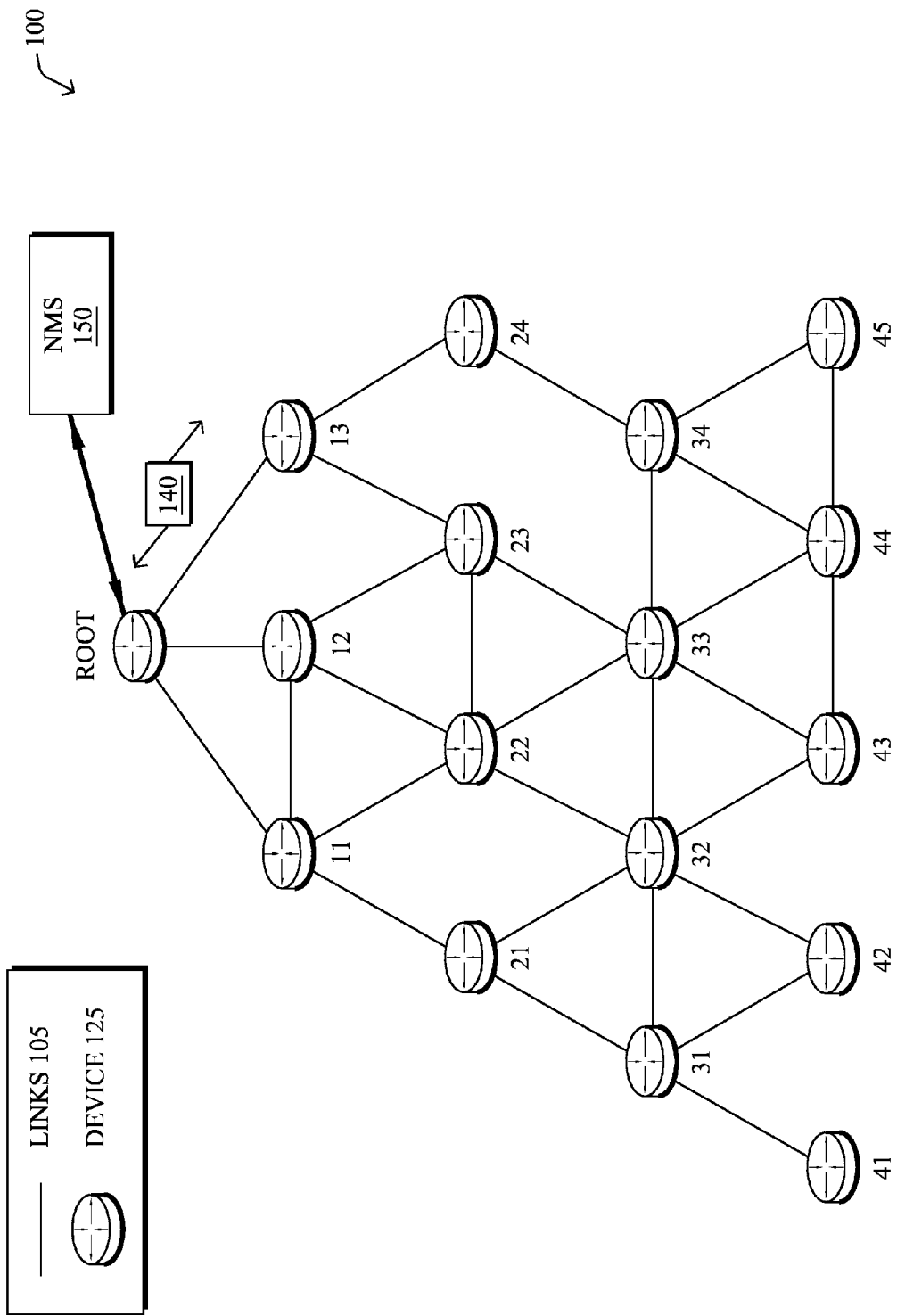
FIG. 1 illustrates an example communication network.

According to one or more embodiments of the disclosure, a network device may receive an indication of a particular future message time, and determines a path validation time that is prior to the particular future message time by an amount at least long enough to detect and report a route change of a path from the network device to a source of the particular future message, wherein the source utilizes the path in reverse to reach the network device for the particular future message. Accordingly, the network device sends, at the path validation time, a keepalive message on the path, where in response to a failure of the keepalive message on the path, the network device repairs the path to the source with a particular route change, and reports the particular route change to the source. According to one or more additional embodiments of the disclosure, the source that transmits the indication may receive the report from the network device of the particular route change of the path to a new path, and in response transmits the particular future message on the new path in reverse.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45," and described in FIG. 2 below) interconnected by various methods of communication. For instance, the links 105 may be wired links and/or shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, various other devices, such as a head-end application device or a network management server (NMS) 150 may be present in the network 100, such as via a WAN reachable by node 11-45 through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
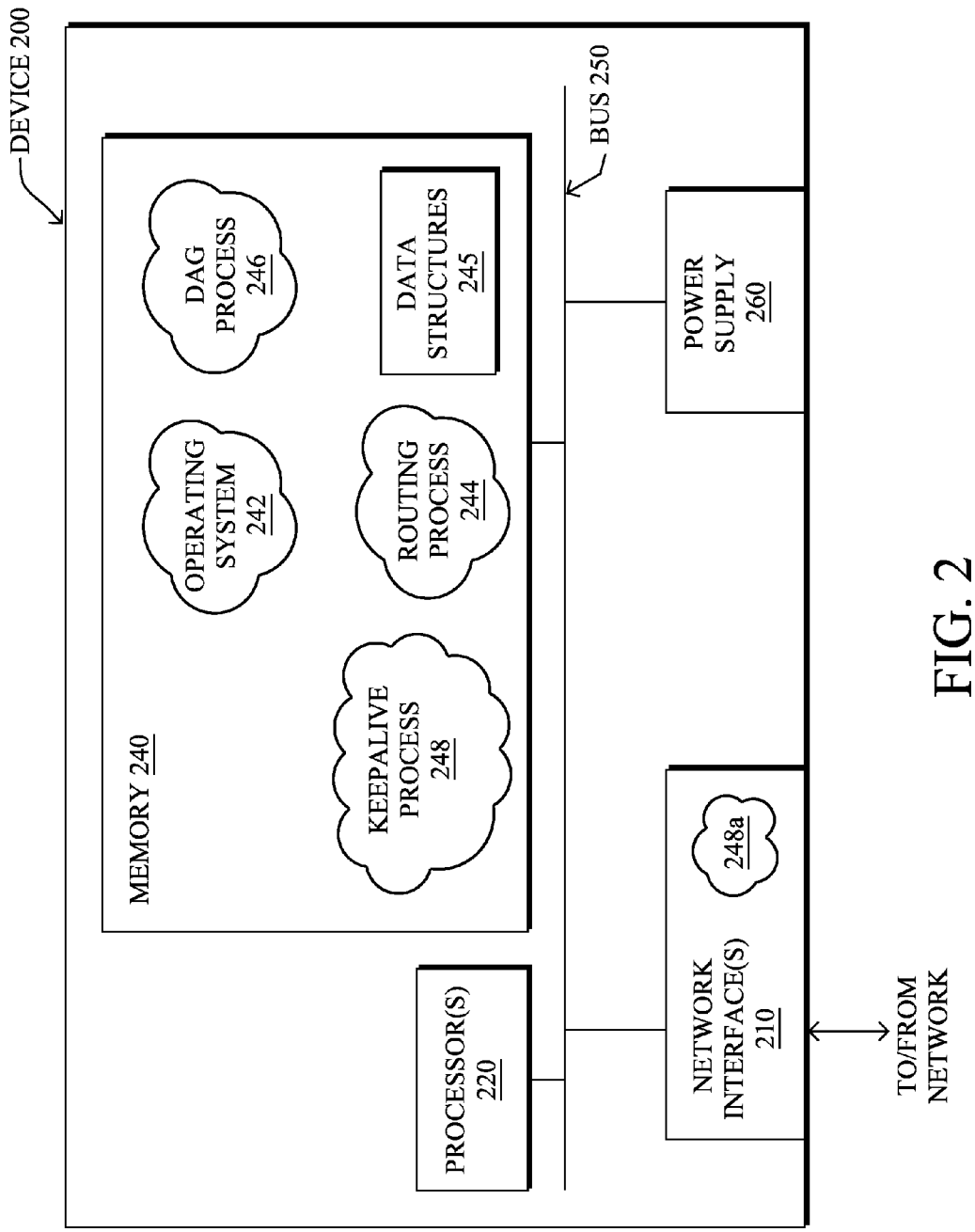
FIG. 2 illustrates an example network device/node.

FIG. 2 is a schematic block diagram of an example node/device 200 that may be used with one or more embodiments described herein, e.g., as any of the devices 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

It should be noted that PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative keepalive process 248, as described herein. Note that while keepalive process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vas seur, et al. (Mar. 1, 2011 version). Further, an example OF (e.g., a default OF) may be found in an IETF Internet Draft, entitled "RPL Objective Function 0" <draft-ietf-roll-of0-15> by Thubert (Jul. 8, 2011 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
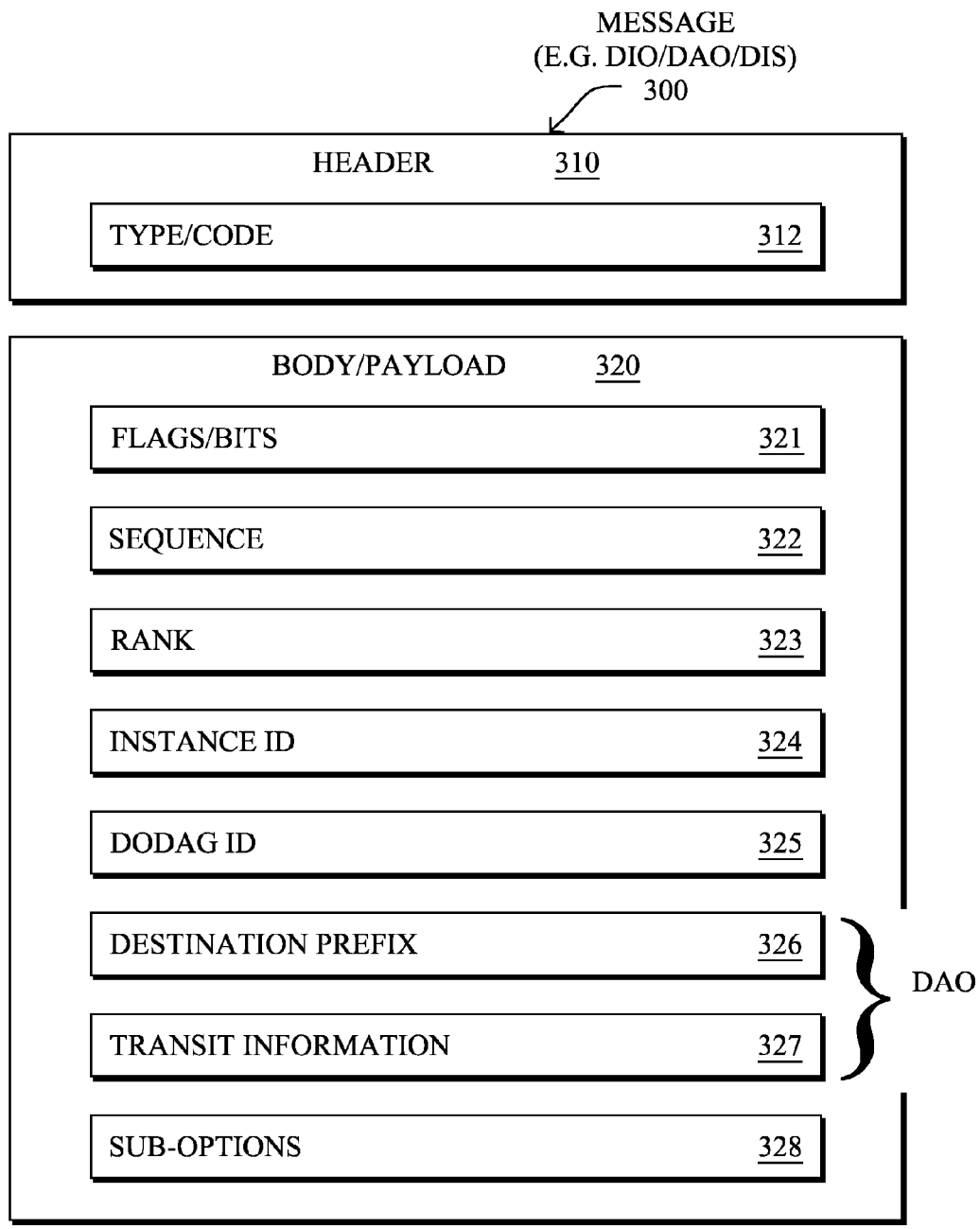
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
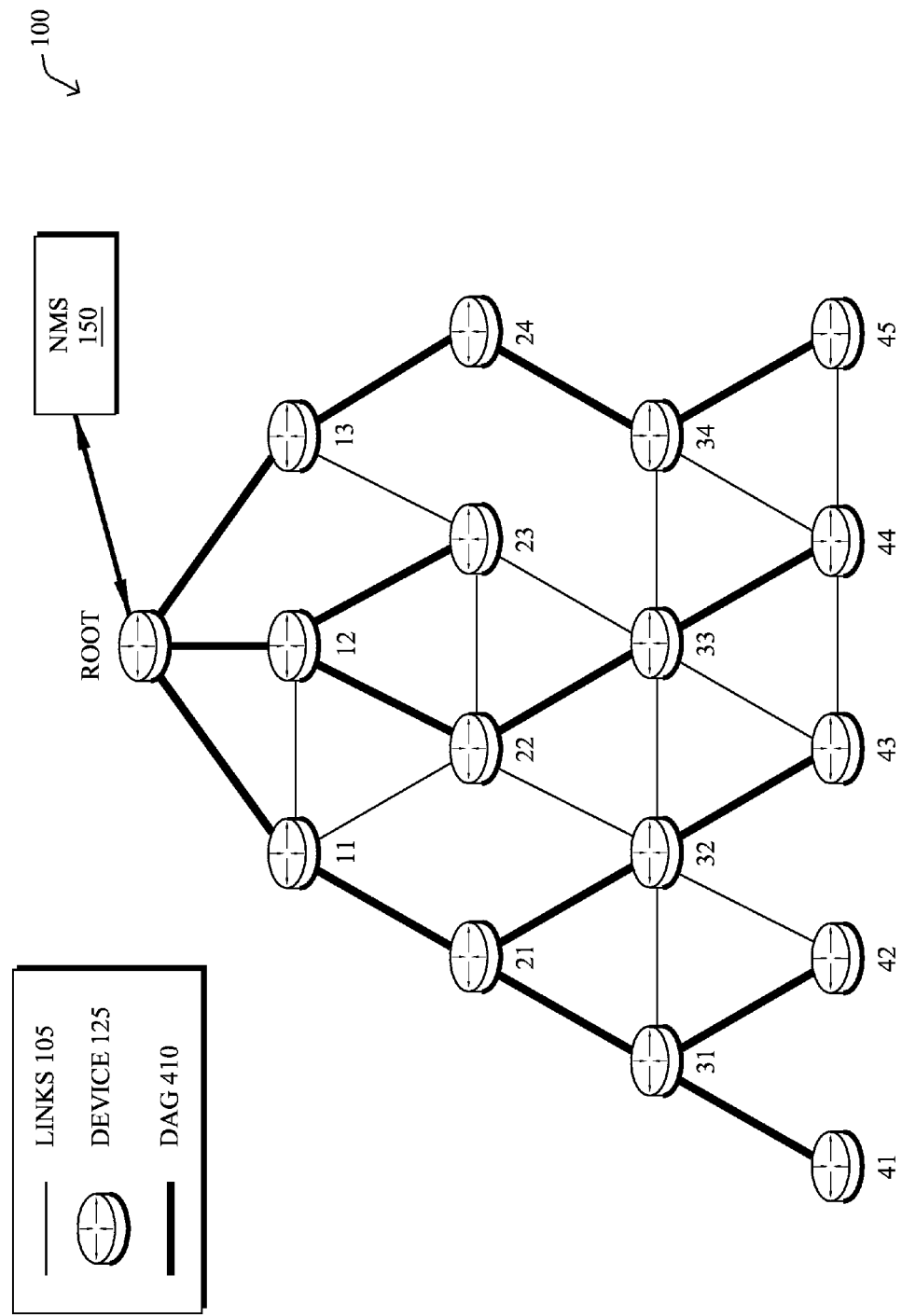
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

Consider, for example, the illustrative cases of a packet 140 sent in the UPWARD direction (i.e., from a network device in the DAG 410 toward/to the root) and in the reverse DOWNWARD direction, (i.e., away from the root toward a particular network device). First, in the UPWARD direction, assume that link 33-22 is down. When node 33 attempts to forward a packet in the UPWARD direction across link 33-22, the node 33 will detect that the link is down, and attempts to select an alternate next-hop (e.g., node 23) or else trigger a local routing repair to find another set of next-hops to send the packet. This reactive approach works well in the UPWARD direction. However, as described below, such a reactive approach does not work as well in the DOWNWARD direction.

In particular, for the DOWNWARD direction, consider a packet 140 sent from the root to node 33. When using source routing, the root will determine a source route from the root to node 33 (e.g., root-12-22-33), append the source route (e.g., using an IPv6 Routing Header), and forwards the packet to node 12. However, when the packet reaches the failing link (e.g., link 22-33), the packet will be dropped.

The fundamental problem is that nodes only maintain links in the UPWARD direction and detect link failures reactively when sending a data packet (generally to avoid proactive keepalive messages). If node 33 has no data packets to send, it will not detect the link failure and will not notify the root that link 22-33 is no longer valid. As a result, the root will continue to send traffic down an invalid path.

Unlike forwarding packets in the UPWARD direction, it is much more difficult to build and repair a routing topology when detecting link failures in the downward direction. In particular, many LLN protocols (e.g., RPL) build routing topologies in the UPWARD direction and reverse the links for use in the DOWNWARD direction. With such protocols, it is the responsibility of devices to maintain their links towards the root. In particular, if node 22 detects that link 22-33 is down, it cannot simply send a message to node 33 to find a new path.

Note that in certain systems, such as unconstrained IP networks, nodes can send regular proactive keepalive messages, then the routing topology will be kept up-to-date on the timescales of the keepalive period. While a short keepalive period will detect link failures more quickly, doing so is costly in resource-constrained environments such as LLNs (e.g., limited energy and channel capacity). In addition, the root could also maintain multiple (diverse) paths and send multiple copies of the packet along each path to increase the likelihood of at least one being received by the destination. However, applying this technique to all traffic is also costly in resource-constrained environments.

Timely Reverse Path Validation

The techniques herein schedule "just-in-time" (dynamic) keepalive messages to proactively repair a routing topology with minimal control-plane impact due to regular keepalive messages. In particular, the techniques herein describe how a node, e.g., the source node, includes timing information in a packet for subsequent messages to the destination device(s), such that forwarding nodes process the timing information and schedule a just-in-time keepalive message just before the next subsequent message to validate, or alternatively, repair, the UPWARD path, thus resulting in a timely repaired DOWNWARD path in the reverse prior to transmission of the subsequent message.

Specifically, according to one or more embodiments of the disclosure as described in detail below, a network device may receive an indication of a particular future message time, and determines a path validation time that is prior to the particular future message time by an amount at least long enough to detect and report a route change of a path from the network device to a source of the particular future message, wherein the source utilizes the path in reverse to reach the network device for the particular future message. Accordingly, the network device sends, at the path validation time, a keepalive message on the path, where in response to a failure of the keepalive message on the path, the network device repairs the path to the source with a particular route change, and reports the particular route change to the source. Also, according to one or more additional embodiments of the disclosure, the source that transmits the indication may receive the report from the network device of the particular route change of the path to a new path, and in response transmits the particular future message on the new path in reverse.

Illustratively, the techniques described herein may be performed by hardware, software, and/or firmware, such as in accordance with the keepalive process 248/248a, which may contain computer executable instructions executed by the processor 220 (or independent processor of interfaces 210) to perform functions relating to the novel techniques described herein, e.g., in conjunction with routing process 244 (and/or DAG process 246). For example, the techniques herein may be treated as extensions to conventional protocols, such as the RPL protocol or else various communication protocols, and as such, may be processed by similar components understood in the art that execute those protocols, accordingly.

Operationally, the techniques herein are generally directed toward sending "just-in-time" keepalive messages based on information about future messages to be sent. For example, such information may be obtained from a Network Management System (NMS) traffic scheduler, based on regularly periodic message sending, or else based on some other knowledge of messages to be sent in the future.

Often, the root node (or NMS 150 or other head-end application) typically utilizes DOWNWARD routes with source routing when sending requests to destination network devices. Due to strict resource constraints in LLNs in particular (e.g., channel capacity, throughput, etc.), such requests may be scheduled to avoid increasing delays, unwanted congestion, etc. With an Advanced Metering Infrastructure (AMI) application, as one example, requests may include a meter read, firmware upgrade, request to read a load curve, etc.

Accordingly, in one or more embodiments herein, the traffic scheduler in the network (e.g., the source device, the root device, or an NMS 150) is augmented to also consider subsequent ("future") messages and/or requests to the same destination(s). By including information on the timing of a future message, e.g., an indication of a particular future message time at which the source intends to transmit the particular future message, destination network devices can initiate a "just-in-time" keepalive message just before the future message to ensure the DOWNWARD path in reverse is still valid, or else perform a route repair if a link failure is detected, as described below.

Note that the indication may be sent from a non-source device, e.g., an NMS (when not the source of a message), with knowledge of the source device. For example, such a mechanism is not only applicable to AMI, but many other verticals such as Industrial Automation, Home and Building automation, etc. In the case of Industrial automation, for instance, the traffic flows are generally predictable, in that existing systems (e.g., time-synchronized mesh protocol or "TSMP") schedule channel sequences, communication slots, etc., based on the application flows. Alternatively, the source device itself may send the indication. In fact, in one specific embodiment, the indication may be transmitted in a message 500 (e.g., request) that was a previous "future" message for which a previous future message time was previously indicated. (Said differently, the particular future message received from the source may contain an indication of another particular future message time.)

Figure 5:
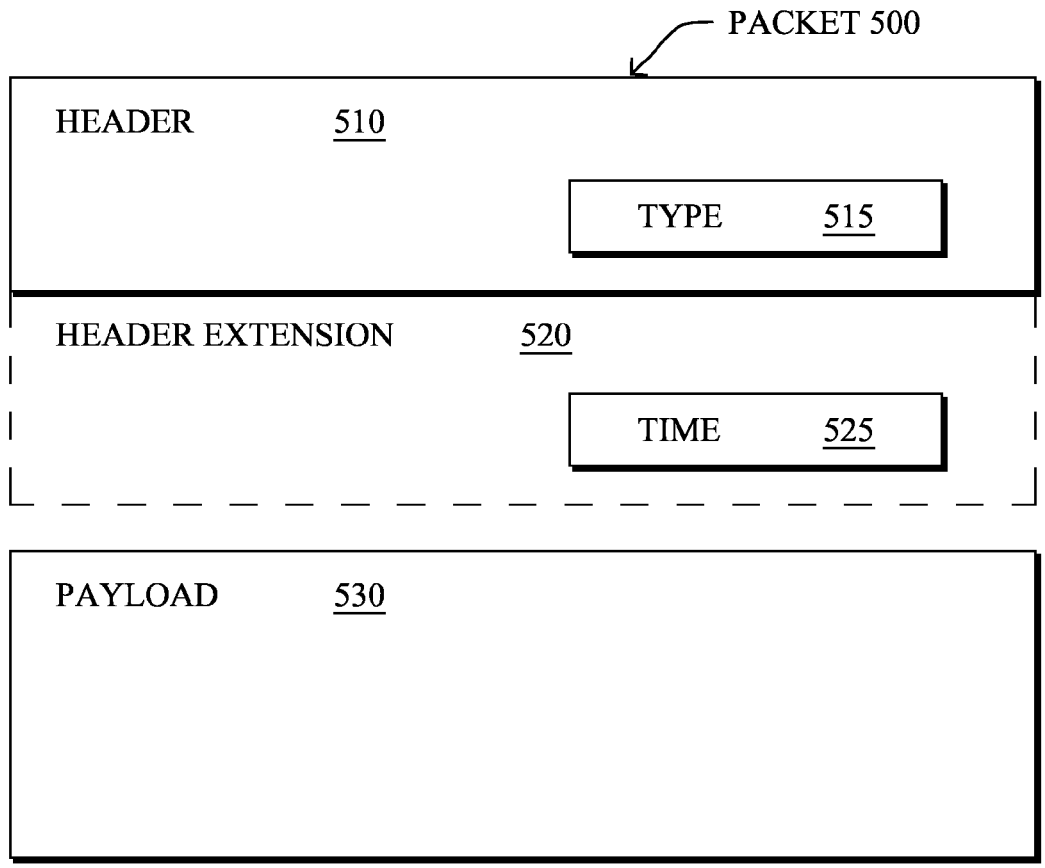
FIG. 5 illustrates an example packet format.

FIG. 5 illustrates an example packet format 500 (e.g., a packet 140), where the packet 500 contains a header 510 and a payload 530, as may be appreciated by those skilled in the art. In particular, the header 510 generally carries the information used to forward the packet 500, such as source and destination addresses, labels, encapsulations, etc., and may include a packet type field 515. In addition, as described herein, an extension 520 to the header 510 may comprise one or more additional fields, such as the "time" field 525, e.g., for use as described herein.

In particular, according to one or more embodiments herein, the techniques may use a new TLV (type-length-value field) carried along with the message that specifies when another message is scheduled for the same destination(s). For example, such a "time" field 525 may illustratively be carried in a "CoAP" Option field (extended header 520), such as defined in the IETF Internet Draft entitled "Constrained Application Protocol (CoAP)" <draft-ietf-core-coap-07>, by Shelby et al. (Jul. 8, 2011 version). For instance, the timing information may be carried in an IPv6 Hop-by-Hop option or other such header 520.

Note that in one illustrative embodiment, the timing information may be in the form of a relative delay (e.g., an approximate time delay) or an absolute time based on a global/shared time base. Relative delay, such as "in one minute," is generally approximate due to uncertainties caused by forwarding delays. Absolute time, on the other hand, requires a global time synchronization mechanism such as network-based time (e.g., the Network Time Protocol or "NTP") or satellite-based time (e.g., global positioning system or "GPS" satellites), which are fairly common. The particular chosen embodiment of the timing information may thus be based on design and/or capability, accordingly.

According to one or more embodiments herein, upon receiving a message 500 the timing information 525, i.e., an indication of a particular future message time, a destination device, e.g., node 33, records the time T(k) at which the device expects to receive a future message from a source device (e.g., the root device). The device then schedules a "just-in-time" keepalive procedure at time T(validate)<T(k). That is, the network device determines a path validation time T(validate) that is prior to the particular future message time T(k) by an amount at least long enough to detect and report a route change of a path from the network device to a source of the particular future message. Illustratively, the path validation time may be a configured time, a configured portion of the particular future message time, or a dynamically computed time.

For example, in one embodiment, T(validate)=current_time+0.75*(T(k)−current_time), where 0.75 is a configured portion constant which may be anywhere from roughly 0.01 to 0.99. In another embodiment T(validate)=T(k)−repair_delay, where repair_delay is the estimated maximum amount of time for detecting a link failure and performing a route repair. The value of repair_delay may be a fixed configuration value or computed dynamically based on the measured time for past route repairs (e.g., one or more past path validation times). One example technique is to use an exponentially weighted moving average low-pass filter (e.g., repair_delay=0.8*repair_delay_old+0.2*repair_delay_new) where repair_delay_new is the most recent observation, and where 0.8 and 0.2 are configurable weighting factors. The repair_delay may also include the time it takes to notify the root of any route updates. Such a value could be provided by an NMS recording statistics provided by the nodes in the network. Note that alternatively or in addition, the computed time may be based on one or more characteristics of the path, such as a path length (e.g., DAG depth), path/link metrics (e.g., ETX), etc.

Figure 6:
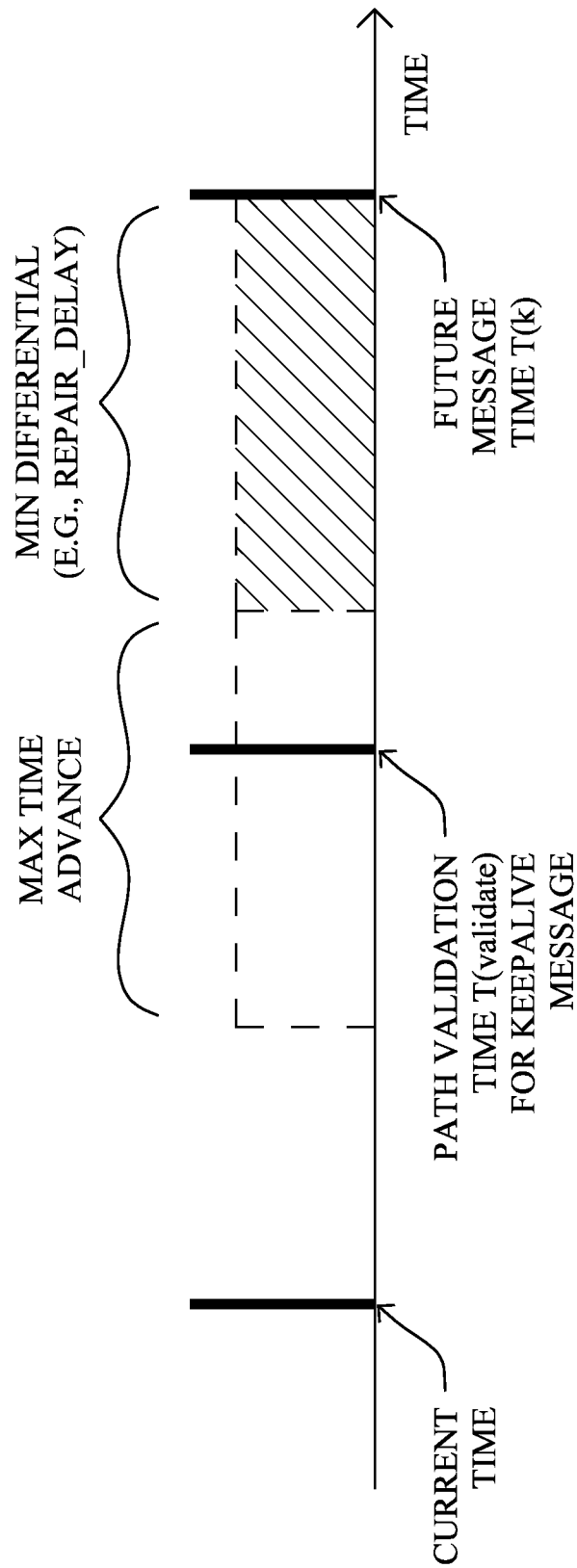
FIG. 6 illustrates an example timing diagram for dynamic "just-in-time" keepalives.

FIG. 6 illustrates an example timing representation of the future message time T(k) in relation to the path validation time T(validate). In particular, as shown, assume that an indication of a future message time T(k) (relative or absolute) is received at a current time. Based on the various embodiments described above, the path validation time T(validate) may then be determined to allow enough time ("min differential") prior to T(k) to allow for the procedure to complete. For instance, T(validate) may be based on a statically configured value, a percentage of the time difference between the current time and T(k), or else based on a determined repair_delay time. Note that in certain embodiments, care may be taken to ensure that the validation time T(validate) remains within a maximum time window (max time advance) in order to prevent the validation from becoming stale, particularly in networks such as LLNs where the state of the links may change rapidly.

Figure 7A:
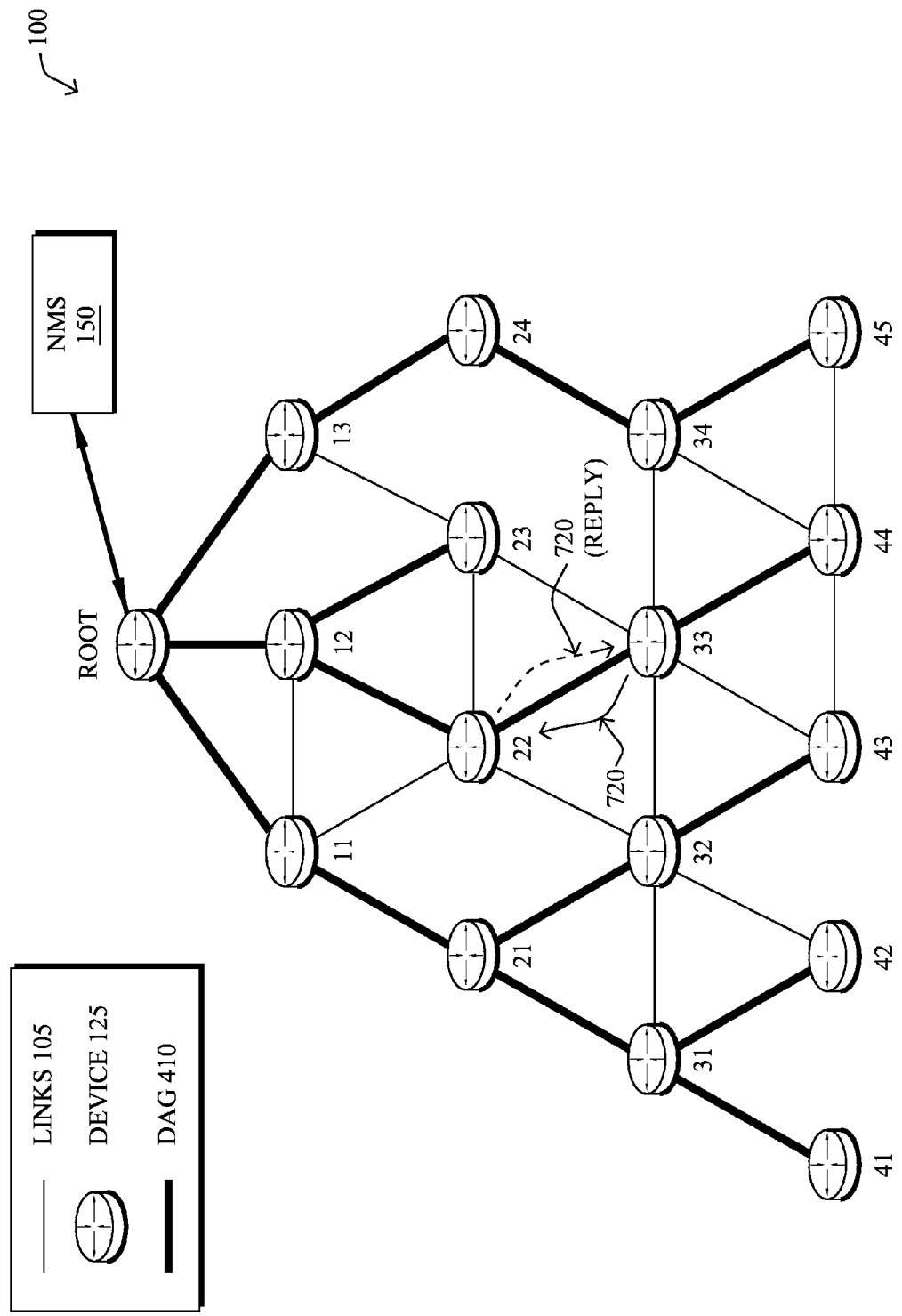
FIGS. 7A-7B illustrate example keepalive messages.
Figure 7B:
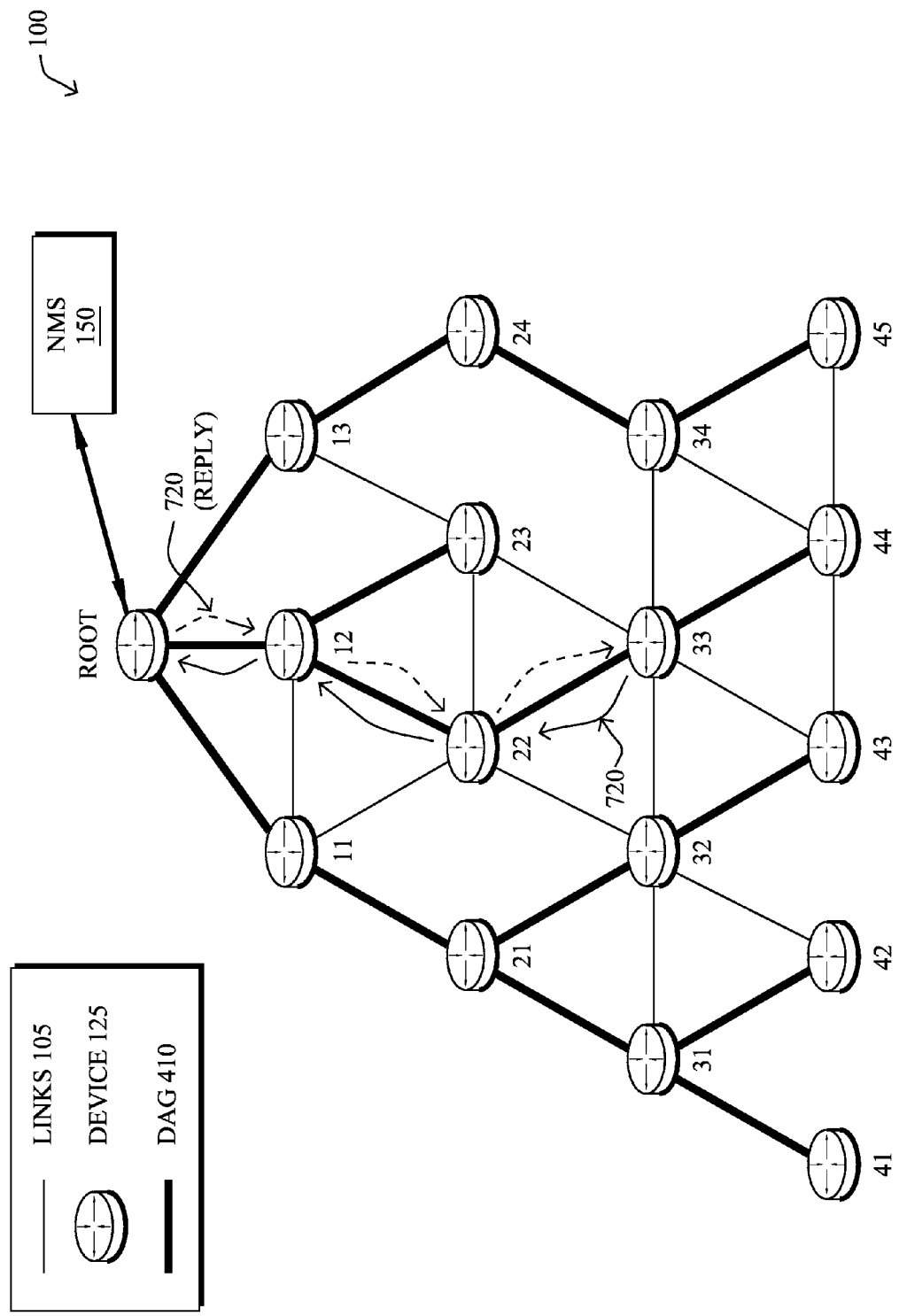

Illustratively, as shown in FIGS. 7A-7B, the keepalive message may be sent as a single-hop keepalive message to a next-hop node on the particular path, or as a full-path keepalive message toward the source, respectively. For instance, in a first embodiment shown in FIG. 7A, the destination node itself may be the only node required to send a keepalive message 720, such as from node 33 to 22 (link 33-22). In another embodiment, as shown in FIG. 7B, the requester (e.g., source, NMS, head-end, etc.) could request that the network device send a just-in-time keepalive message 720 at T(validate) to the source in order to check the entire path. In this embodiment, each node along the path may individually send a just-in-time keepalive message to their next-hop, e.g., based on time T(k) at which the respective device will be used again to forward packets in the DOWNWARD direction.

Alternatively in FIG. 7B, a keepalive message 720 may be sent across an entire path (e.g., forwarded all the way to the source device without intermediate processing). While these two embodiments would enforce checking of an entire path, the drawback is that they may generate additional control traffic. As such, in one particular embodiment, an end-to-end just-in-time keepalive technique may be used for selected traffic (e.g., critical alarms). In other words, in response to determining that a particular future message is a specific type of message, the keepalive message may be sent as either type of "full-path" keepalive message toward the source. Note that in one or more embodiments, a multi-hop keepalive, i.e., from two hops away up to the source device (e.g., based on a configured time-to-live "TTL" value) may also be used as an intermediate compromise between a single-hop keepalive and a full-path keepalive, accordingly.

Figure 8A:
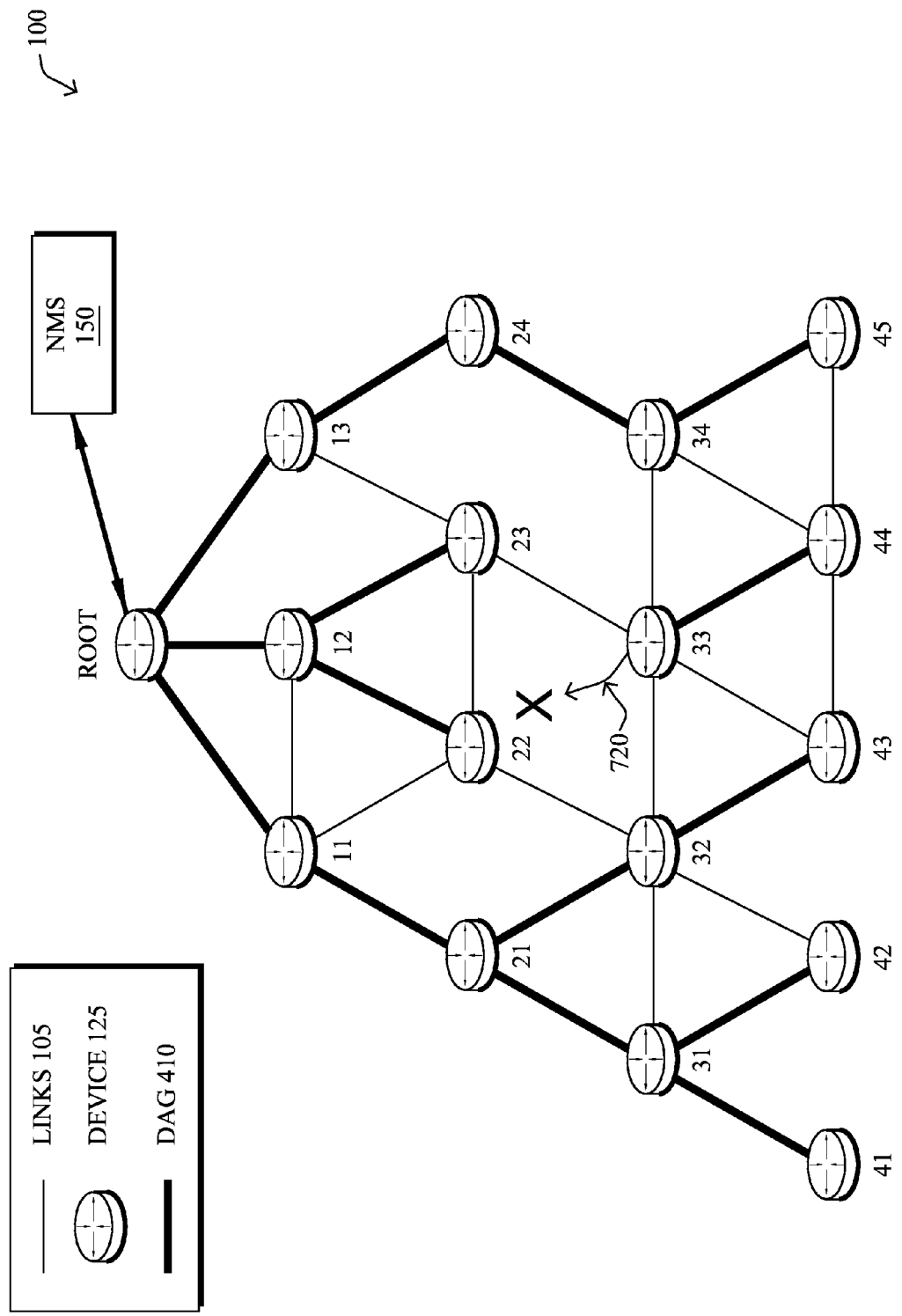
FIGS. 8A-8D illustrate portions of an example progression of proactive source-based reverse path validation.
Figure 8B:
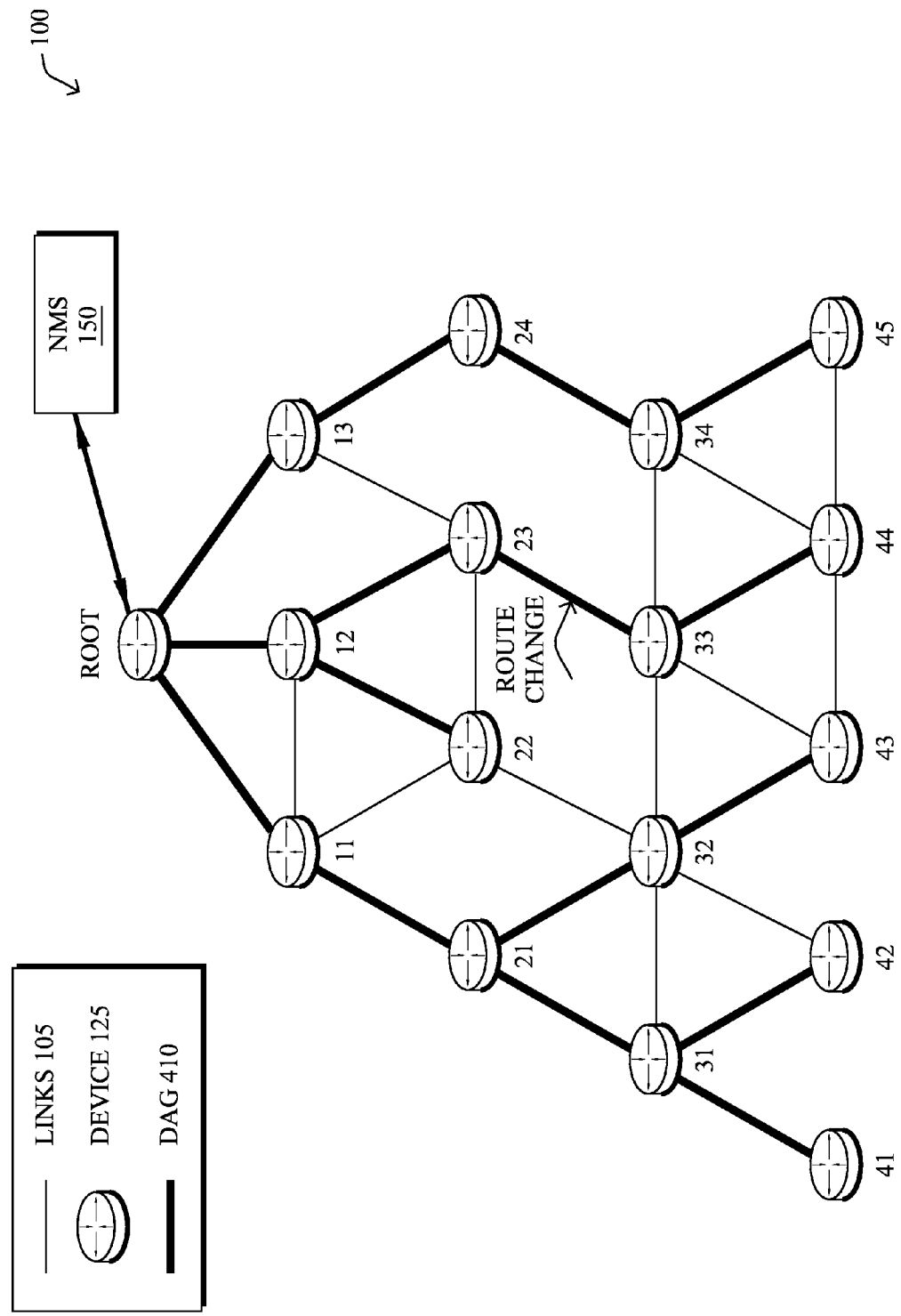
Figure 8C:
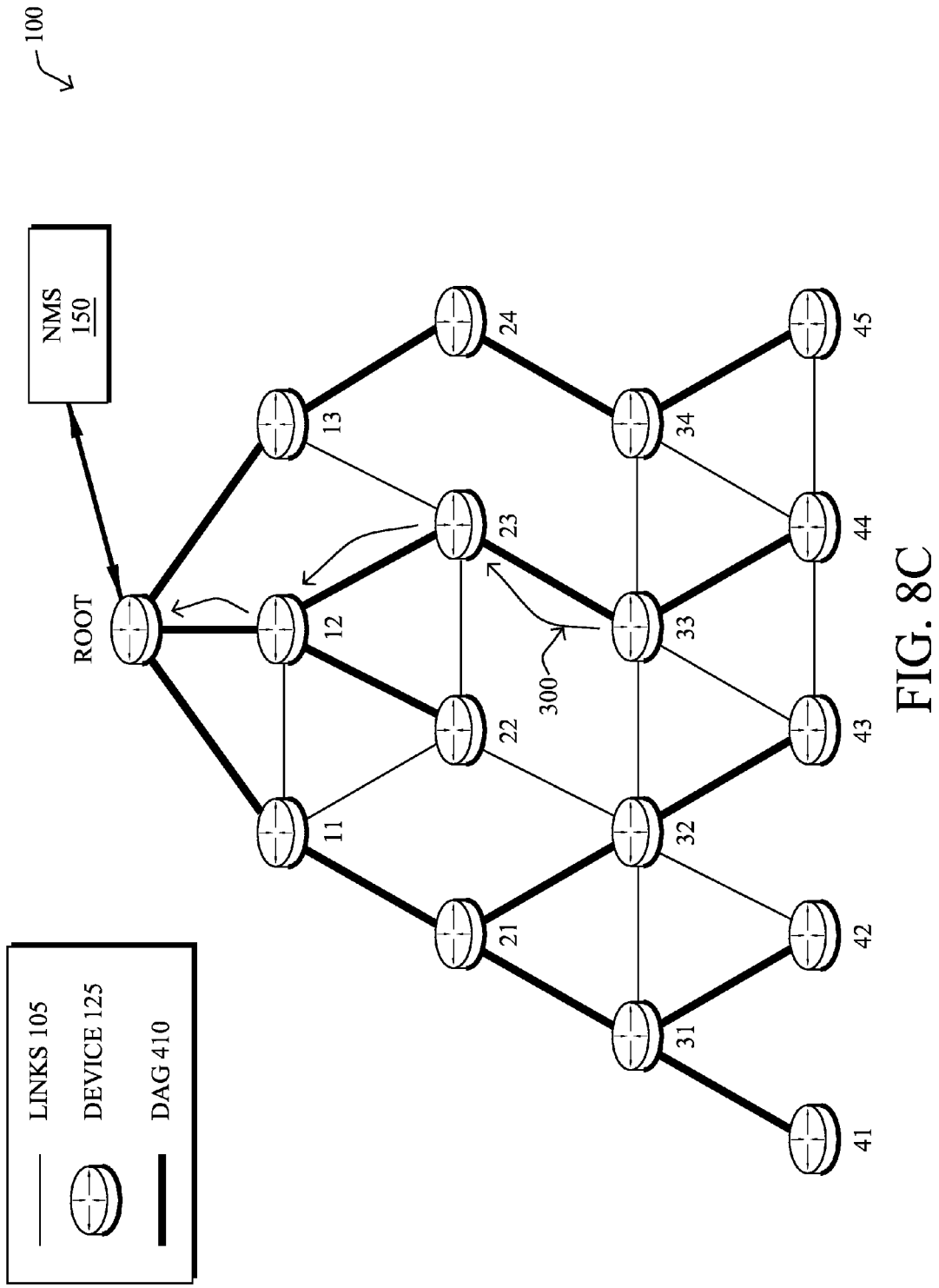

According to the local node scheduler (keepalive process 248/248a), at time T(validate) the network device checks that the local preferred link is still valid (i.e., by sending a keepalive message 720 at the determined path validation time), such as shown in FIG. 8A. If the next-hop link is valid, the procedure stops. On the other hand, in response to a failure of the keepalive message on the path, the network device proactively repairs the broken path to the source with a route change, e.g., as shown in FIG. 8B (for example, via node 23). The route change may be based on switching to an alternate next-hop/parent, re-building the local topology and re-attach to another node in the network, etc. For example, in the case of RPL or other techniques such as MPLS TE, the network device could trigger a local repair. In addition, as shown in FIG. 8C, the network device reports the particular route change to the source (e.g., root), such as by sending a conventional routing message 300 to update the root's routing information.

Figure 8D:
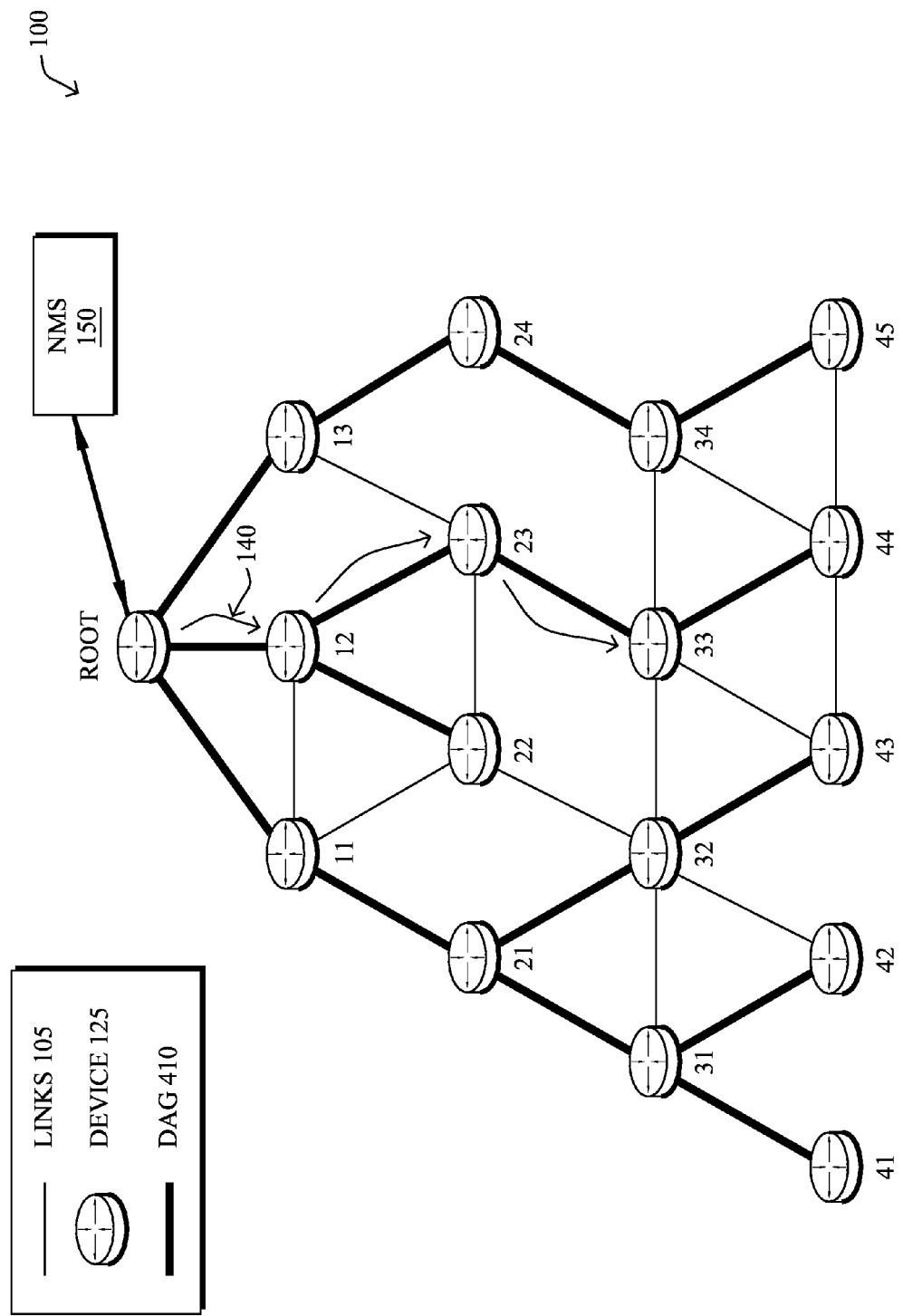

According to the techniques herein, therefore, upon receiving a message with an indication of timing information for a subsequent (future) message, the network device may schedule a just-in-time keepalive message just before receiving the next message. The traffic scheduler (e.g., NMS 150, root node, and/or other source device) provides the timing information. If the path is still valid, i.e., validating the path in response to receiving no report from the network device of any route change of the path, the future message/packet would be transmitted to follow the same (i.e., current) path. Otherwise, i.e., in response to failure of the keepalive, the destination network device will proactively repair the path and update the root with a new route. In response to receiving a report from the network device of a particular route change of the path to a new path, the source device then transmits the particular future message (packet 140) on the new DOWNWARD path (the reverse of the new UPWARD path), as shown in FIG. 8D.

Figure 9:
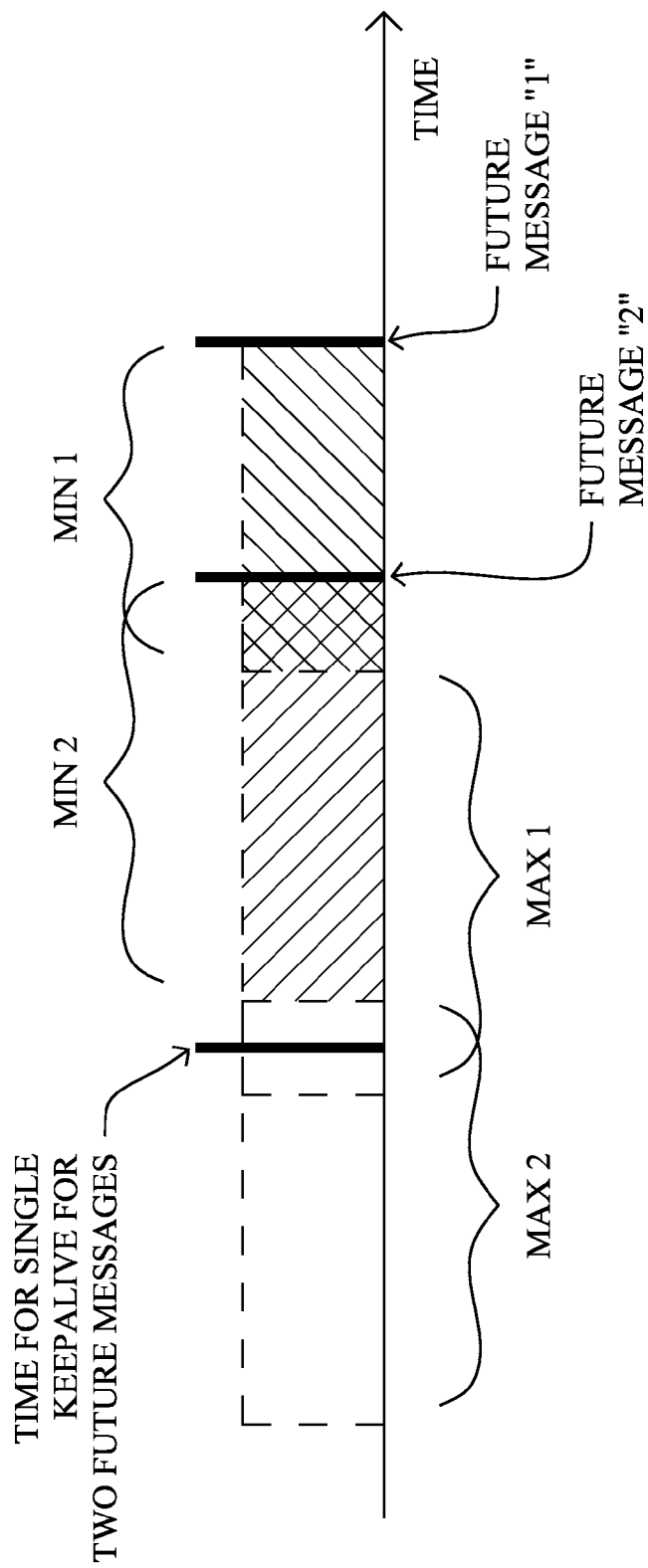
FIG. 9 illustrates another example timing diagram for dynamic "just-in-time" keepalives, e.g., for multiple validations.

Note that the local node schedule may also be configured to manage packets indicating different T(k) values (a plurality of indications) that may or may not be for the same destination, such as by suppressing just-in-time keepalives that are close in time or for links that have been verified with other traffic (e.g., data traffic). For instance, in one embodiment, the local scheduler (process 248) may simply schedule a just-in-time keepalive for each T(k). In another embodiment, however, two or more of the plurality of indications may be consolidated into one resultant keepalive message, such as illustrated in FIG. 9. For example, the node may schedule a single just-in-time keepalive before the T(k) nearest in time, or else in yet another embodiment, the node may schedule a single just-in-time keepalive as shown (outside of each MIN period, and within each MAX period) or multiple keepalives depending on how close the different T(k) values are. In addition, in certain embodiments, a node may cancel one or more just-in-time keepalive messages if other messages (e.g., data messages sent in the UPWARD or DOWNWARD direction) have verified that a link is valid (i.e., in response to validating the path in the DOWNWARD direction through a non-keepalive message on the path in either direction).

Figure 10:
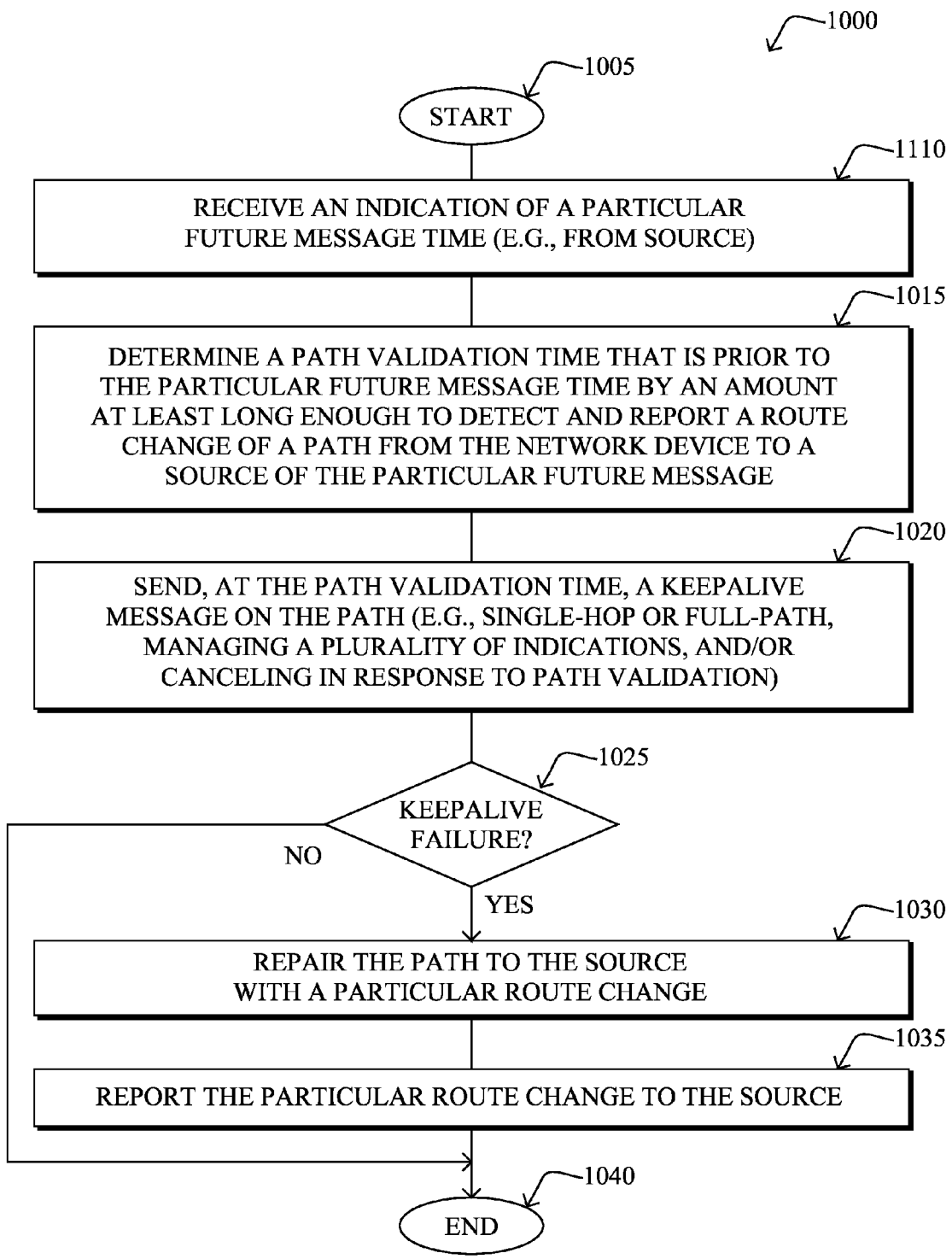
FIG. 10 illustrates an example simplified procedure for proactive source-based reverse path validation, e.g., from the perspective of the destination device.

FIG. 10 illustrates an example simplified procedure for proactive source-based reverse path validation in accordance with one or more embodiments described herein, e.g., from the perspective of the destination device. The procedure 1000 starts at step 1005, and continues to step 1010, where, as described in greater detail above, a destination network device, e.g., node 33, receives an indication of a particular future message time, such as a time 525 in a packet 500 from a source device (e.g., root device). In response, in step 1015, the network device determines a path validation time that is prior to the particular future message time by an amount at least long enough to detect and report a route change of a path from the network device to a source of the particular future message (e.g., as shown in FIG. 6, above). Accordingly, in step 1020, the network device may send a keepalive message 720 (single-hop or full-path) on the path at the path validation time. Note that as described above, step 1015 may take into consideration other indications (validations), and may be based on static or dynamic times. In addition, the keepalive may canceled in response to other path validation, such as from data packets 140, as noted above.

In the event there is a keepalive failure in step 1025, then in step 1030 the network device repairs the path to the source with a particular route change, and in step 1035 reports the particular route change to the source. The procedure may then illustratively end in step 1040, in response to reporting the change or else in response to no change being necessary.

Figure 11:
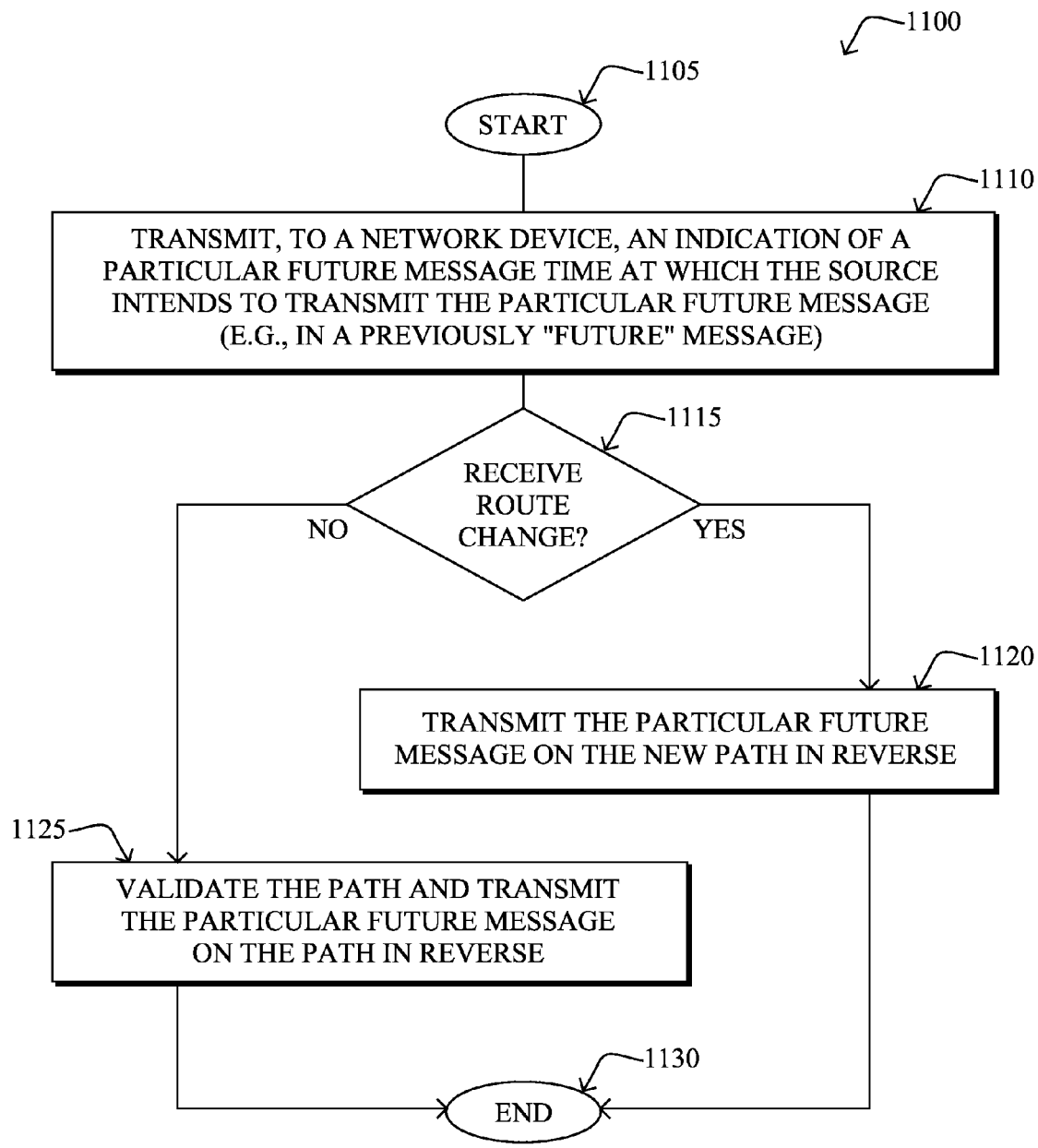
FIG. 11 illustrates an example simplified procedure for proactive source-based reverse path validation, e.g., from the perspective of the source device.

In addition, FIG. 11 illustrates an example simplified procedure for proactive source-based reverse path validation in accordance with one or more embodiments described herein, e.g., from the perspective of the source device. The procedure 1100 starts at step 1105, and continues to step 1110, where, as described in greater detail above, the source (e.g., root) device transmits, to a network device, an indication of a particular future message time at which the source intends to transmit the particular future message (e.g., in a previously "future" message). If in response a route change is received in step 1115, then in step 1120 the source transmits the particular future message on the new path in reverse at (or near) the scheduled time. Conversely, if there is no route change in step 115, then in step 1125 the source validates the current path and transmits the particular future message on the path in reverse. The illustrative procedure 1100 ends in step 1130.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The novel techniques described herein, therefore, provide for proactive source-based reverse path validation in a computer network. In particular, the techniques herein dynamically send UPWARD keepalives closely prior to an expected DOWNWARD message is to be received on the reverse path. That is, the techniques herein address a significant issue in networks where sending regular keepalive messages is not a viable option (e.g., the vast majority of LLNs), for example, by proactively repairing DOWNWARD paths while minimizing the cost of the control plane, thus dramatically increasing the network availability for DOWNWARD traffic.

While there have been shown and described illustrative embodiments that provide for proactive source-based reverse path validation in a computer network, it is to be understood that various other adaptations and modifications may be made within the spirit and scope of the embodiments herein. For example, the embodiments have been shown and described herein with relation to LLNs. However, the embodiments in their broader sense are not as limited, and though well-suited for constrained networks, may, in fact, be used with other types of networks and/or protocols. In addition, while certain protocols are shown, such as RPL, other suitable protocols may be used, accordingly. Also, while the techniques generally describe the root node as sourcing the future messages, other head-end nodes and/or network management system/server (NMS) devices may also source future messages.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a network device, an indication of a particular future message time and an address of a destination within a header of a message that is sent from a source in the network to the destination, wherein the particular future message time indicates when a particular future message will also be sent by the source to the destination;
determining a path validation time that is prior to the particular future message time by an amount at least long enough to detect and report a route change of a path from the network device to the source of the particular future message, wherein the source utilizes the path in reverse to reach the network device for the particular future message;
sending, from the network device at the path validation time, a keepalive message on the path; and
in response to a failure of the keepalive message on the path:
 i) repairing the path to the source with a particular route change; and
 ii) reporting the particular route change to the source.

2. The method as in claim 1, further comprising:
receiving the indication from the source.

3. The method as in claim 1, further comprising:
receiving the particular future message from the source, wherein the particular future message contains a second indication of a second particular future message time.

4. The method as in claim 1, wherein the particular future message time is a relative delay or an absolute time.

5. The method as in claim 4, wherein the absolute time is based on a global time that is a network-based time or a satellite-based time.

6. The method as in claim 1, wherein the path validation time is a configured time, a configured portion of the particular future message time, or a dynamically computed time.

7. The method as in claim 6, wherein the path validation time is the dynamically computed time, and wherein determining the path validation time comprises:

determining the path validation time based on at least one of either one or more past path validation times or one or more characteristics of the path.

8. The method as in claim 1, wherein sending the keepalive message on the path includes at least one of:
   i) sending the keepalive message as a single-hop keepalive message to a next-hop node on the path;
   ii) sending the keepalive message as a full-path keepalive message toward the source; or
   iii) sending the keepalive message as a multi-hop keepalive message toward the source.

9. The method as in claim 8, further comprising:
   determining that the particular future message is a specific type of message; and
   sending the keepalive message as the full-path keepalive message toward the source in response to determining that the particular future message is the specific type of message.

10. The method as in claim 1, further comprising:
    managing a plurality of indications at the network device.

11. The method as in claim 10, further comprising:
    consolidating two or more of the plurality of indications into one resultant keepalive message.

12. The method as in claim 1, further comprising:
    stopping the sending of the keepalive message in response to validating the path in reverse through a non-keepalive message on the path.

13. An apparatus, comprising:
    one or more network interfaces to communicate in a computer network;
    a processor coupled to the network interfaces and configured to execute one or more processes; and
    a memory configured to store a process executable by the processor, the process when executed operable to:
       receive an indication of a particular future message time and an address of a destination within a header of a message that is sent from a source in the network to the destination, wherein the particular future message time indicates when a particular future message will also be sent by the source to the destination;
       determine a path validation time that is prior to the particular future message time by an amount at least long enough to detect and report a route change of a path from the apparatus to a source of the particular future message, wherein the source utilizes the path in reverse to reach the apparatus for the particular future message;
       send, at the path validation time, a keepalive message on the path; and
       in response to a failure of the keepalive message on the path:
          i) repair the path to the source with a particular route change; and
          ii) report the particular route change to the source.

14. The apparatus as in claim 13, wherein the process when executed is further operable to:
    receive the particular future message from the source, wherein the particular future message contains a second indication of a second particular future message time.

15. The apparatus as in claim 13, wherein the particular future message time is a relative delay or an absolute time.

16. The apparatus as in claim 13, wherein the path validation time is a configured time, a configured portion of the particular future message time, or a dynamically computed time.

17. The apparatus as in claim 13, wherein the process when executed to send the keepalive message on the path is further operable to send the keepalive as a a single-hop keepalive message to a next-hop node on the path, a full-path keepalive message toward the source, or a multi-hop keepalive message toward the source.

18. The apparatus as in claim 17, wherein the process when executed is further operable to:
    determine that the particular future message is a specific type of message; and
    send the keepalive message as the full-path keepalive message toward the source in response to determining that the particular future message is the specific type of message.

19. The apparatus as in claim 13, wherein the process when executed is further operable to:
    manage a plurality of indications.

20. The apparatus as in claim 13, wherein the process when executed is further operable to:
    stop the sending of the keepalive message in response to validating the path in reverse through a non-keepalive message on the path.

21. A method, comprising:
    transmitting, from a source to a network device, an indication of a particular future message time and an address of a destination within a header of a message that is sent from the source to the destination, wherein the particular future message time indicates when a particular future message will also be sent by the source to the destination, wherein the network device is configured to send, in response, a keepalive message on a path from the network device to the source at a path validation time that is prior to the particular future message time by an amount at least long enough to detect and report a route change of the path;
    receiving a report from the network device of a particular route change of the path to a new path; and, in response,
    transmitting the particular future message on the new path in reverse.

22. The method as in claim 21, further comprising:
    validating the path in response to receiving no report from the network device of any route change of the path; and, in response
    transmitting the particular future message on the path in reverse.

23. The method as in claim 21, wherein the particular future message time is a relative delay or an absolute time.

24. The method as in claim 21, wherein transmitting the indication comprises:
    including the indication in a message that was a previous future message for which a previous future message time was previously indicated.

25. An apparatus, comprising:
    one or more network interfaces to communicate in a computer network;
    a processor coupled to the network interfaces and configured to execute one or more processes; and
    a memory configured to store a process executable by the processor, the process when executed operable to:
       transmit, to a network device, an indication of a particular future message time and an address of a destination within a header of a message that is sent from the source to the destination, wherein the particular future message time indicates when a particular future message will also be sent by the source to the destination, wherein the network device is configured to send, in response, a keepalive message on a path from the network device to the apparatus at a path validation time that is prior to the particular future message time by an amount at least long enough to detect and report a route change of the path;
receive a report from the network device of a particular route change of the path to a new path; and, in response,
transmit the particular future message on the new path in reverse.

\* \* \* \* \*

UNITED STATES PATENT AND TRADEMARK OFFICE
CERTIFICATE OF CORRECTION

PATENT NO. : 9,013,983 B2  
APPLICATION NO. : 13/230154  
DATED : April 21, 2015  
INVENTOR(S) : Vasseur et al.

Page 1 of 1

It is certified that error appears in the above-identified patent and that said Letters Patent is hereby corrected as shown below:

In the Specification

In column 6, line 41, please replace:
"Vas seur, et al." with "Vasseur, et al."

In column 13, line 17, please amend as follows:
may be canceled in response to other path validation, such as Signed and Sealed this  
Eighteenth Day of August, 2015

Michelle K. Lee  
*Director of the United States Patent and Trademark Office*